C. SANG.
POTATO PICKER.
APPLICATION FILED OCT. 7, 1919.

1,343,586.

Patented June 15, 1920.
2 SHEETS—SHEET 1.

INVENTOR
CHARLEY SANG.

BY
ATTORNEYS

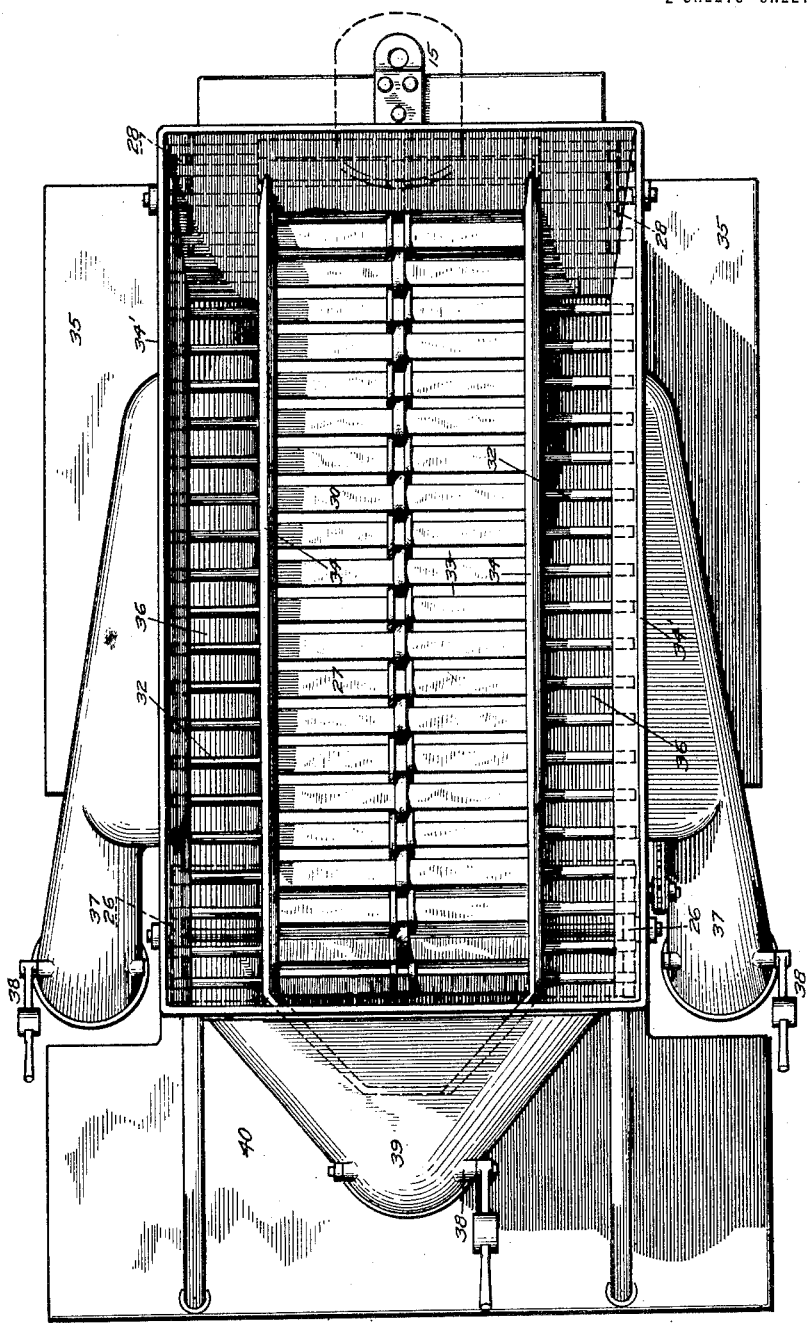

UNITED STATES PATENT OFFICE.

CHARLEY SANG, OF CASTROVILLE, CALIFORNIA.

POTATO-PICKER.

1,343,586.  Specification of Letters Patent.  Patented June 15, 1920.

Application filed October 7, 1919. Serial No. 329,151.

*To all whom it may concern:*

Be it known that I, CHARLEY SANG, a citizen of China, residing at Castroville, in the county of Monterey and State of California, have invented new and useful Improvements in Potato-Pickers, of which the following is a specification.

This invention relates to a potato picker.

Due to the scarcity of labor throughout the agricultural districts and the prohibitive prices charged by labor when it is obtainable, it has been found imperative to produce some device by which potatoes could be easily separated from the soil, sorted and packed. With this demand in view, it is the principal object of the present invention to provide a potato picker which will operate in conjunction with the ordinary potato digger, and which will permit a few farm hands to sort the potatoes and pick them from the dirt as the digger proceeds along the field, thus cutting down the expenditure of time and insuring that the operation will be done thoroughly and speedily.

The present invention contemplates the use of a carriage, upon which is mounted a traveling draper. This draper is adapted to receive the dirt and potatoes from a potato digger and is so arranged as to provide three areas over which the dirt and potatoes are carried, and which will insure that the dirt may be separated from the potatoes by hand and the potatoes thereafter sorted as they are carried along the separate portions of the conveyer to various sacking chutes.

The invention is illustrated by way of example in the accompanying drawings, in which—

Fig. 2 is a view in plan, showing the complete potato picker and more particularly disclosing the draper arrangement thereof.

Figure 1:
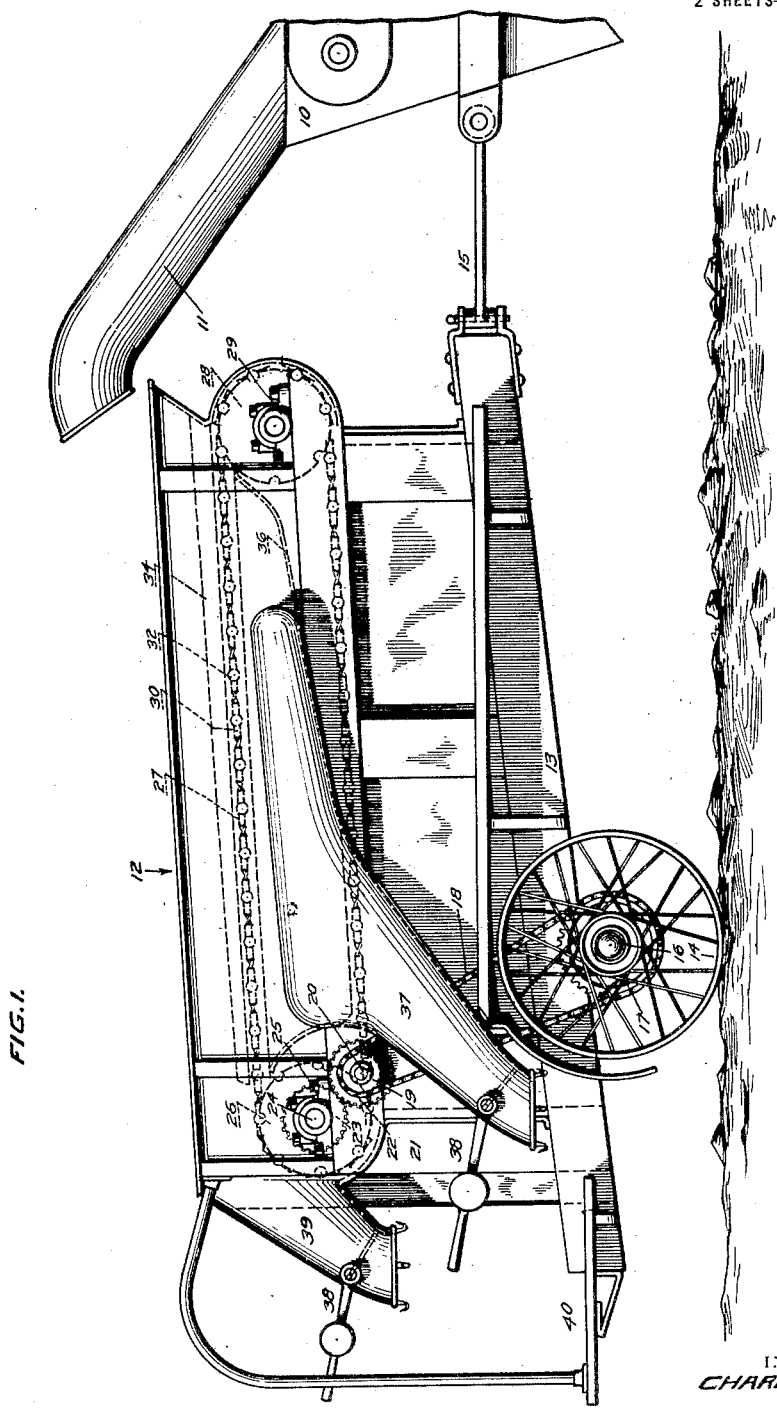
Figure 1 is a view in side elevation, illustrating the present invention and showing its connection with a potato digger.

Referring more particularly to the drawings, 10 indicates a potato digger, which may be of any desired construction and which is adapted to be drawn along the ground and to dig the potatoes. The potatoes and the dirt therewith are then elevated through a suitable elevator 11 and are dumped upon the potato picker 12, with which the present invention is particularly concerned. This potato picker is formed with a sub-frame 13, having one set of wheels 14 disposed near its rear end and its front end being fitted with a suitable draw-bar connection 15, by which it may be attached to the potato digger and will move therewith. The wheels 14 of the running gear are secured to an axle 16 and will rotate therewith. This provides a suitable driving motion for a gear or sprocket 17. In the present instance a sprocket is shown, which is fitted with a sprocket chain 18, leading upwardly along the side of the front frame 13 and around a small driven sprocket 19. The driven sprocket is carried upon a shaft 20, which is journaled upon the side of the main body 21 of the machine. This shaft also carries a gear 22 in mesh with a second gear 23. The gear 23 is fixed upon a shaft 24 carried in bearings 25 on the frame, and near the rear end of the frame. This shaft 24 is also provided with a series of sprocket or driving disks 26, over which a draper 27 is led. The draper is of the endless conveyer type and disposed in a horizontal path of travel rearwardly around the driving disk 26 and then forwardly around a second idler disk 28, which is secured in bearings 29 on the front of the machine body.

By referring more particularly to Fig. 2, it will be seen that the draper is formed of a plurality of slats 30. These slats are carried upon conveyer chains 31, which are spaced in relation to each other, and act to hold the draper structure together and to drive it as these chains pass around the driving disk 26 and the idler disk 28. It will be noted that the slats are substantially rectangular in section throughout the center of the machine and are reduced to form cylindrical portions 32 near the opposite ends of the draper. The central portions of the slats are thus spaced from each other, as indicated at 33, to allow the loose dirt to fall through the draper and onto the ground. The opposite ends are spaced from each other a greater distance and afford means whereby large and small potatoes may be sorted from each other in a manner which will be hereinafter set forth.

The center portion of the draper formed of the rectangular-sectioned slats is divided from the end portion formed by the sections 31 by means of vertically extending side boards 34. These boards are held in parallel relation above the draper and thus divide the exposed upper surface of the draper into three sections; the central portion upon which the potatoes and dirt are dumped, and two end portions upon which all of the potatoes are deposited as picked by hand as the potato picker progresses. The operators of the machine are provided with running boards 35 at the opposite sides of the body of the machine and may stand in a convenient relation to the draper so that the dirt and potatoes may be separated on the portion of the draper between the side rails 34 and the potatoes then dropped upon the end portions of the draper, the smaller potatoes falling between the spaces and the larger potatoes being carried toward the rear end of the draper. The small potatoes will fall upon a floor 36 and be carried into a chute 37, one of which is mounted upon each side of the draper body and is adapted to receive a potato sack. These chutes are controlled by valve mechanism 38 so that it will be possible to check the flow of potatoes while the sacks are being interchanged. The large potatoes are carried along the draper and are deposited into a central hopper 39, which is disposed in the rear of the machine and over a back running board 40. This hopper is also controlled by a valve mechanism 38 by which the flow of potatoes may be stopped when changing sacks.

In operation of the present invention, it will be evident that when the potatoes and dirt associated therewith are dumped upon the central portion of the draper; that is, the portion between the side rails 34 and 35, the material will be carried rearwardly of the machine, the fine dirt falling between the slats 30. The operator then manually separates the potatoes from the dirt and drops the potatoes upon the end sections of the draper between the side rails 34 and outer side boards 34'. Immediately the small potatoes will fall between the slats and be conveyed through the tube 37 while the large potatoes will be carried along the slats and into the chute 39. In this manner two grades of potatoes will be provided and will be automatically separated, the only manual operation being required to separate the potatoes from the dirt.

It will thus be seen that due to this arrangement a single draper may be used to convey the potatoes and dirt conveniently to the operator and used furthermore to sort the potatoes and convey them to their separate sacks, thus insuring that by a very simple machine, all of the desired operation may be accomplished and carried on as the potato digger progresses through the field.

While I have shown the preferred form of my invention as now known to me, it will be understood that various changes might be made in the combination, construction and arrangement of parts by those skilled in the art, without departing from the spirit of the present invention.

Having thus described my invention, what I claim and desire to secure by Letters Patent is:—

1. A potato cleaner and classifier comprising a single endless traveling carrier belt having longitudinal partitions dividing it into a central and two side compartments, transverse rectangular slats in the central compartment upon which the potatoes and excavated dirt are received and through which the dirt escapes, transverse cylindrical slats in the side compartments through which the smaller potatoes may fall, chutes below each side compartment to receive and direct said small potatoes, and independent receivers therefor, other chutes connecting with the ends of the side carriers, into which the larger potatoes fall, said chutes converging therefrom to a common receiver.

2. A potato cleaner and classifier including a single endless horizontally traveling carrier, means dividing the carrier into a plurality of longitudinal parallel sections, rectangular transversely separated slats, crossing the central section of the carrier, and means to deposit uncleaned potatoes thereon, reduced cylindrical slats, extending across the side sections of the carrier, and chutes and receivers beneath each side section.

3. A potato cleaner and classifier including an endless horizontally traveling carrier, a digger and a chute delivering the potatoes to the center of the carrier, means dividing the carrier into a plurality of parallel sections, rectangular transversely separated slats connected with the carrier in the central section, said slats having reduced cylindrical ends extending across the side sections of the carrier, and means provided by said ends by which the potatoes placed thereon are classified in sizes.

4. In a potato cleaner and classifier of the character described, an endless traveling carrier, longitudinally subdivided into a plurality of separate sections, means for delivering uncleaned potatoes upon the central section of the carrier, means borne by the carrier to separate loose dirt from the potatoes, means extending from the central means into the side sections to classify potatoes received therein, converging chutes by which the sized potatoes are delivered at separate points of discharge, and gates controlling said separate discharges.

In testimony whereof I have hereunto set my hand in the presence of two subscribing witnesses.

CHARLEY SANG.

Witnesses:
 Thos. Renison,
 Sam Alstyer.